United States Patent
Larzabal et al.

(10) Patent No.: US 7,587,042 B2
(45) Date of Patent: Sep. 8, 2009

(54) HIGH PERFORMANCE ADSL LINE CONDITIONER SYSTEM AND METHOD

(75) Inventors: Luis R. A. Larzabal, Mountain View, CA (US); Edward P. Ponganis, Modesto, CA (US)

(73) Assignee: Phylogy, Inc., Santa Clara, CA (US)

( * ) Notice: Subject to any disclaimer, the term of this patent is extended or adjusted under 35 U.S.C. 154(b) by 361 days.

(21) Appl. No.: 11/316,781

(22) Filed: Dec. 23, 2005

(65) Prior Publication Data

US 2006/0098804 A1    May 11, 2006

Related U.S. Application Data

(63) Continuation-in-part of application No. 10/889,090, filed on Jul. 12, 2004, now Pat. No. 7,110,528.

(51) Int. Cl.
   *H04M 1/00* (2006.01)
   *H04M 9/00* (2006.01)
(52) U.S. Cl. .................. 379/340; 379/344; 379/347
(58) Field of Classification Search ............. 379/340, 379/344, 347
   See application file for complete search history.

(56) References Cited

U.S. PATENT DOCUMENTS

| | | | |
|---|---|---|---|
| 2,725,532 A | 11/1955 | Radcliffe, Jr. | |
| 4,331,842 A | 5/1982 | Kiko | |
| 5,140,703 A * | 8/1992 | Payne | 455/226.1 |
| 5,678,198 A | 10/1997 | Lemson | |
| 5,953,412 A * | 9/1999 | Sheets et al. | 379/414 |
| 6,208,732 B1 | 3/2001 | Moschytz et al. | |
| 6,212,229 B1* | 4/2001 | Salinger | 375/224 |
| 6,459,684 B1 | 10/2002 | Conroy et al. | |
| 6,584,147 B1* | 6/2003 | Schaumont et al. | 375/220 |
| 6,798,769 B1 | 9/2004 | Farmwald | |
| 6,978,009 B1* | 12/2005 | Dettmer | 379/388.03 |
| 7,130,413 B2* | 10/2006 | Dettmer | 379/388.06 |
| 2002/0031113 A1 | 3/2002 | Dodds et al. | |
| 2002/0097863 A1* | 7/2002 | Rahamim et al. | 379/399.01 |
| 2002/0105964 A1* | 8/2002 | Sommer et al. | 370/463 |
| 2002/0171475 A1 | 11/2002 | Picha et al. | |
| 2003/0007632 A1 | 1/2003 | Schoessow | |

* cited by examiner

*Primary Examiner*—Alexander Jamal
(74) *Attorney, Agent, or Firm*—Barry N. Young

(57) ABSTRACT

A DSL line conditioner achieves high performance sufficient to simultaneously support video, voice and data signals on standard telephone twisted pair lines over substantially greater distances than are currently available. The line conditioner automatically adjusts and sets the upstream and downstream preamplifier gains and attenuations according to the actual degradation imposed upon the upstream and downstream signals by the twisted pair line in which the line conditioner is used. The line conditioner achieves high performance by optimizing the signal-to-noise ratio and signal quality of DSL signals, and has a low power budget that enables it to operate by deriving power from the twisted pair lines over which it is used.

34 Claims, 9 Drawing Sheets

HIGH PERFORMANCE ADSL LINE CONDITIONER SYSTEM AND METHOD

CROSS REFERENCE TO RELATED APPLICATIONS

This application is a continuation-in-part of application Ser. No. 10/889,090, filed Jul. 12, 2004 now U.S. Pat. No. 7,110,528, the disclosure of which is incorporated by reference herein.

BACKGROUND OF THE INVENTION

This invention relates generally to Digital Subscriber Line (DSL) technology, and more particularly to line conditioning systems and methods affording high performance broadband digital service over long local subscriber loops using ADSL (Asymmetrical DSL) technology.

Most telephone companies provide analog telephone service, often referred to as plain old telephone service (POTS), and other services to customers using a legacy infrastructure typically comprising a single twisted pair (TP) of wires for each telephone number. Each TP line is referred to as a subscriber loop or a subscriber line. POTS lines were constructed to carry a single voice signal with a 3.4 kHz bandwidth channel. DSL technology permits high-speed, high-bit rate digital transmission via lossy TP lines, but requires signal processing to overcome transmission impairments due, for example, to signal attenuation, crosstalk noise from the signals present on other lines, signal reflections, radio-frequency noise, and impulse noise. Due to the very poor high frequency performance of conventional TP lines, high-speed DSL operation (10+Mbps) is typically limited to short local loop lengths between the telephone central office (CO) and the subscriber's customer premises (CPE) of the order of 8,000-10,000 feet because of the DSL signal degradation at the higher frequencies. Signal attenuation, which is the largest component of transmission impairment, increases with frequency and line length. Accordingly, for a given transmission method the maximum achievable transmission bit rate decreases as the line length increases. The achievable data rate is also limited by other factors such as group delay, which is also a function of frequency, as well as crosstalk and noise.

Asymmetric DSL (ADSL) is a DSL technology that has a greater downstream frequency spectrum from the CO toward the CPE than the upstream frequency spectrum to the CO, and employs a much greater downstream bit rate than the upstream bit rate. This reduces near-end crosstalk, and the frequency spectrum supports simultaneous transport of duplex POTS and data on the TP. ADSL1 has a maximum signal bandwidth of the order of 1.1 MHz. ADSL2+ has a maximum signal bandwidth of the order of 2.2 MHz. Typically, the frequency spectrum between 0-30 kHz is reserved for POTS service. The spectrum between 34-125 kHz is the upstream data, and the spectrum above 164 kHz is for the downstream data.

In an effort to compete with cable service providers, some telephone service providers employ ADSL2+ technology for broadband digital data, such as Internet access, and television services (IPTV) on the same TP. Each NTSC TV channel requires approximately 4.4 Mbps when using MPEG-2 compression, and a HDTV channel requires approximately 8 Mbps. Some telephone companies are providing two channels of video-on-demand TV service as well as 3.0 Mbps of Internet broadband service, which requires a total data rate of the order of 11.8 Mbps. ADSL2+ technology can achieve this total bit rate, however, service providers can typically provide such combined video and broadband services up to local loop lengths of about 8,000 feet.

The prior application referenced above discloses an in-line amplifier for TP wire signals that enables a substantial improvement to the rate and reach of conventional ADSL technology. However, it is also desirable to obtain greater improvement and higher performance (rate and reach) to permit reliable operation of the newer DSL technologies, i.e., ADSL2+ and VDSL2, along with conventional POTS service, over greater distances than are currently available. And in doing so, it is also desirable to deploy a simple installation, inexpensive, low power consumption technology that can be powered directly from the TP lines on which it operates without disrupting the normal POTS service. It is to these ends that the present invention is directed.

SUMMARY OF THE INVENTION

The invention provides DSL line conditioning systems and methods which afford high performance by optimizing the signal-to-noise ratio (SNR) and signal quality across the DSL frequency spectrum using low noise, low power components and circuits that afford good line equalization and compensation, high common mode rejection, and low crosstalk. More particularly, the invention affords higher data rates at longer loop lengths than are achievable with current technology, and can provide data rates of the order of 12 Mbps with high signal quality, thus enabling the simultaneous transmission of two channels of TV and 3 Mbps of broadband data at distances of the order of 12,000 feet.

In one aspect, the invention provides a method of conditioning a twisted pair telephone line for high data rate broadband operation to extend the distance over which such the line is able to support such operation at a predetermined level of performance. The method first measures line characteristics, including attenuation, at an intermediate location on the line between two points, such as a central office and a customer premises. The line is then automatically equalized to overcome the line attenuation by providing a first gain to downstream signals and a second gain to upstream signals, and is further compensated for group delay.

In another aspect, the invention provides a method of conditioning a twisted pair telephone line for high data rate broadband operation to extend the distance over which such the line is able to support such operation at a predetermined level of performance. The method first measures line characteristics, including attenuation, at an intermediate location on the line between two points, such as a central office and a customer premises, and the line is automatically equalized to overcome the line attenuation by low-noise pre-amplifying downstream signals to provide high signal-to-noise and low-noise pre-amplifying upstream signals for low signal-to-noise.

In still a further aspect, the invention affords a line conditioner that comprises programmable gain preamplifiers for equalizing a twisted pair line for downstream signals from a central office and for upstream signals from a customer premises, detectors for detecting levels of downstream and upstream setup tones related to line attenuation, and a microprocessor for automatically programming the gains of the preamplifiers in response to the levels of the tones to equalize the twisted pair and overcome the effects of attenuation.

In more specific aspects, the invention uses peak equalization to provide a desired gain-frequency characteristic to equalize the line for DSL operation. The invention employs low-noise, low-power analog circuits for line conditioning that optimize signal-to-noise and signal quality, and operate at low power so that they may be powered by the twisted pair telephone line without disrupting normal telephone service.

Other aspects, features and advantages of the invention will be described in the following description and drawings.

DESCRIPTION OF PREFERRED EMBODIMENTS

The invention is particularly well adapted to a high performance line conditioner for use with ADSL2+ technology, and will be described in that context. It will be appreciated, however, that this is illustrative of only one utility of the invention, and that the invention is applicable to other high bit rate digital operations, including VDSL2, and interleaved DSL systems, as well as for other types of high bit rate digital operations on twisted pair (TP) telephone lines.

Figure 1:
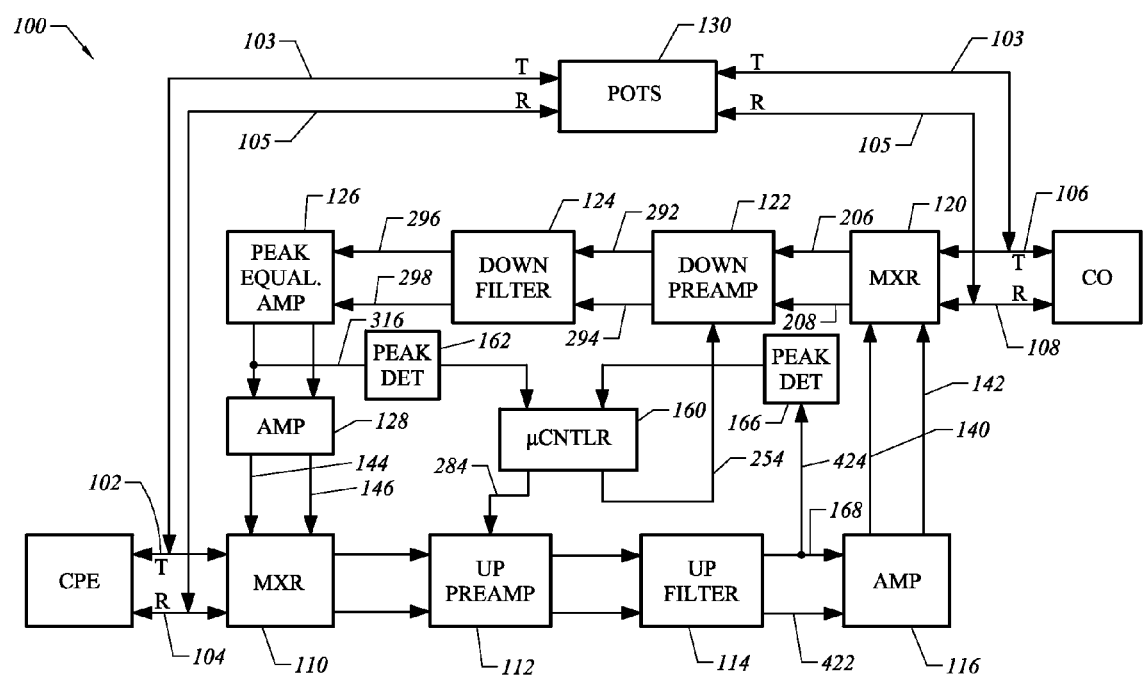
FIG. 1 is a block diagram of a line conditioner in accordance with the invention employed in a local loop between a telephone central office and a subscriber's customer premises.

FIG. 1 is a block diagram of a preferred embodiment of a bi-directional broadband line conditioner 100 in accordance with the invention. The line conditioner may be inserted into a local subscriber loop comprising a POTS twisted pair at an intermediate location between a central office (CO) and a customer's premises (CPE) to permit high data rate, broadband data and video services. In one embodiment, the line conditioner 100 can provide a data rate of approximately 12 Mbs which can support two separate 4.4 Mbps television video signals and one 3.0 Mbps broadband signal with equal or better performance than conventional approaches, as well as providing conventional POTS telephone service, over a local loop of the order of 12,000 feet or more.

As indicated in FIG. 1, the conventional local loop comprises a twisted pair (TP) of differential signal lines including a Tip (T) line 102, 103, 106 and a Ring (R) line 104, 105, 108. The Tip and Ring lines carry analog signals which provide the conventional POTS service in a frequency range up to approximately 30 kHz. A DSL modem (not shown) in the CPE converts digital signals to analog form for upstream transmission from the CPE to the CO over the Tip and Ring TP lines in, for example, a frequency band from approximately 34 kHz to 125 kHz. A DSL Access Multiplexer (DSLAM) (also not shown) in the CO converts digital signals to analog form for downstream transmission to the CPE over the Tip and Ring lines. The downstream frequency spectrum may extend from approximately 164 kHz to 2.2 MHz (for ADSL2+).

The upstream signal from the CPE travels over a length of TP lines 102 and 104 between the CPE and the intermediate location of the line conditioner 100. The upstream path through line conditioner 100 is through a mixer 110, an adjustable gain upstream preamplifier 112, a filter 114, a driver amplifier 116, and another (downstream) mixer 120. Mixer 120 provides the upstream signal to the CO over another length of TP lines 106 and 108, respectively, between the line conditioner and the CO. The downstream signal path from the CO to the CPE is via Tip and Ring lines 106 and 108, and through mixer 120, an adjustable gain downstream broadband preamplifier 122, a filter 124, a peak equalizer amplifier 126, a driver amplifier 128, and the upstream mixer 110. Mixer 110 provides the downstream signals from the driver amplifier 128 to the CPE over the Tip and Ring lines 102 and 104, respectively. Conventional telephone service does not go through the line conditioner, but rather is carried on Tip and Ring 103 and 105 lines through a POTS filter/splitter 130. The POTS filter/splitter blocks the high frequency upstream and downstream signals so that they go through the line conditioner 100, and provides a low impedance path to the low frequency telephone signals.

Figure 2:
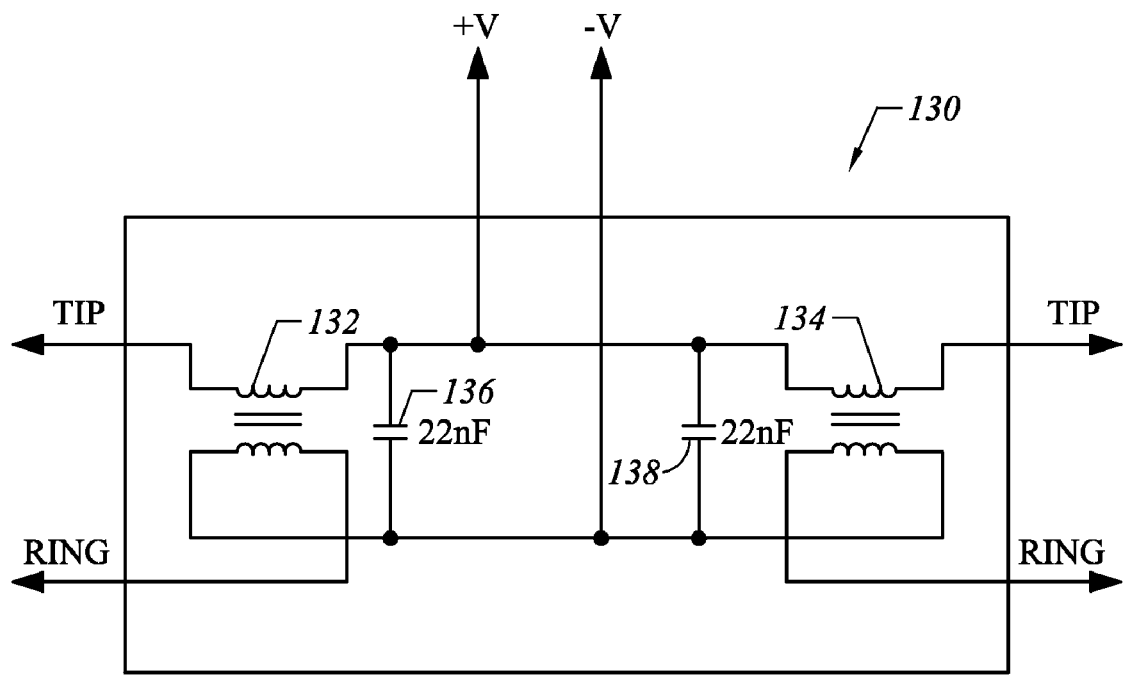
FIG. 2 is a schematic diagram of an embodiment of a POTS filter/splitter that may be employed with the invention.

An embodiment of a conventional POTS filter/splitter is illustrated in FIG. 2. As shown, it may comprise a pair of transformers 132, 134 connected into the Tip and Ring lines 103 and 105 and a pair of capacitors 136 and 138 connected across the Tip and Ring lines, as shown. Positive and negative DC voltages +V and −V may be provided from the Tip and Ring lines, respectively, for deriving operating power for the circuits in the line conditioner. As will be described, the line conditioner 100 is preferably designed to consume low power so that the current drawn from the Tip and Ring lines for powering the line conditioner is sufficiently low that it does not interfere with normal telephone operation.

Upstream mixer 110 and downstream mixer 120, which may be substantially the same, serve two principal functions. They block the low frequency conventional telephone signals from flowing through the line conditioner from the CO and the CPE, causing them to flow through the POTS filter/splitter 130, and they separate the upstream and downstream signals from one another for processing by the line conditioner. The downstream mixer 120 couples downstream signals from the CO on lines 106 and 108 to the downstream preamplifier 122, receives upstream signals on lines 140, 142 from amplifier 116, and couples them to the CO. The mixer additionally attenuates the unwanted upstream signals that are coupled through the mixer to the downstream preamplifier 122. Similarly, upstream mixer 110 couples the upstream signals from the CPE to the upstream preamplifier 112, and couples downstream signals on lines 144, 146 from driver amplifier 128 to the CPE via Tip and Ring lines 102 and 104, respectively. The upstream mixer 110 similarly attenuates unwanted downstream signals that are couple through the mixer into the upstream path to upstream preamplifier 112.

Line conditioner 100 is not simply an amplifier that boasts signal strength to overcome the signal attenuation imposed by the TP line to extend range, which is the approach taken by conventional ADSL line repeaters. Rather, line conditioner 100 optimizes the signal-to-noise ratio (SNR) and signal quality, which results in higher performance and greater range, while simultaneously minimizing power consumption in order to stay within a desired low power budget imposed by the telephone lines. The line conditioner optimizes SNR by reducing to low levels the system noise floor through the use of low noise, high bandwidth, low power operational amplifiers ("opamps") and other active elements, and by a circuit design and structure that minimizes thermal and ohmic noise contributions of circuit components and provides high out-of-band signal rejection, high common mode rejection and low crosstalk. Moreover, the line conditioner optimizes signal characteristics, primarily amplitude and group delay, through pre- and post-equalization and pre- and post-compensation of the downstream and upstream signals entering and leaving the line conditioner to compensate for signal degradation imposed by the TP lines. As used herein, the terms "equalization", "equalizes" and "equalizer" refer to amplitude level adjustment of signals, for example to correct for TP line attenuation. The terms "compensation" and "compensates" refers to adjustment of group delay characteristics, for example to correct for signal degradation due to group delay imposed by the TP lines.

The line conditioner automatically adjusts the gain equalizations applied to the signals based upon the actual attenuation the signals experience during transmission over the TP between the CO and the CPE. The line conditioner additionally applies a preset pre-compensation and post-compensation to the signals to compensate (i.e., correct) for the effects of group delay of the TP lines from the CO to the line conditioner and from the line conditioner to the CPE, respectively. Accordingly, by addressing the overall signal degradation imposed by the TP lines, and by focusing on optimizing high performance and signal quality, the line conditioner of the invention achieves a higher data rate per line length and a substantially better range than do conventional line repeaters which address only signal attenuation. In fact, the invention can achieve the same distance as conventional approaches at one-quarter of the power. Line conditioner 100 equalizes and compensates both the upstream and downstream signals, although it processes the downstream signals more than the upstream signals since they experience the greatest degradation due to the TP because of their higher frequency spectrum.

Downstream signals from mixer 120 are provided to the broadband preamplifier 122, which applies a preset gain (or attenuation) to the downstream signal as determined automatically for the current session during a pre-operational calibration process preformed by a microcontroller or a microprocessor 160 (in a manner to be described). The downstream signal from the preamplifier is then supplied to a downstream filter 124, which in the case of ADSL is a high pass filter that passes downstream frequencies above 164 kHz and blocks the upstream frequencies below 125 kHz. Filter 124 is designed to have a sharp cutoff in order to strongly reject unwanted upstream frequencies that are coupled through mixer 120 and preamplifier 122 to the filter, and to help insure a low system noise floor. In a preferred embodiment, filter 124 is an 11-th order elliptical high pass filter which provides approximately 80 dB to 90 dB rejection of upstream frequencies below 125 kHz.

The downstream signals from filter 124 are next applied to the peak equalizer amplifier 126. The peak equalizer has a maximum gain at a preset frequency, which is preferably in the upper portion of the frequency spectrum of the ADSL downstream signal. The "Q" of the peak equalizer response determines the sharpness of the peak and the amplification applied to the range of frequencies around the preset frequency. Equalization affects the data carrying ability of the signal because it changes the amplitude relationships of the fundamental and harmonic frequencies of the ADSL signal. The peak equalizer amplifier post-equalizes for the frequency-dependent signal attenuation of the downstream signal caused by the TP line 106, 108 between the CO and the line conditioner, and pre-equalizes for the anticipated frequency-dependent attenuation due to the TP line 102, 104 from the signal conditioner to the CPE, so that the downstream signal arriving at the CPE modem has the desired equalized gain-frequency characteristic. Driver amplifier 128 amplifies the downstream signal from peak equalizer amplifier 126 to provide a desired signal level at the CPE, and supplies the signal to mixer 110, which couples the signal to the Tip and Ring lines 102 and 104 for transmission to the CPE.

The upstream path through line conditioner 100 is somewhat similar to the downstream path, except that it may not include a peak equalizer amplifier. An equalization amplifier is not necessary for the upstream ADSL signal because it operates in a lower (and narrower) frequency spectrum than the downstream signal, and does not experience as much frequency-dependent degradation as does the downstream signal. The upstream signals leaving mixer 110 are coupled to an upstream adjustable gain-attenuation preamplifier 112, which also applies a preset gain or attenuation to the upstream signal as automatically determined by the microcontroller 160 during the pre-operation calibration process (to be described). The upstream signals from preamplifier 112 are applied to a low pass filter 114 which preferably has a sharp cut off slightly above 125 kHz. The upstream signals from the filter are passed to driver amplifier 116 which amplifies the upstream signals and couples them through mixer 120 onto the Tip and Ring lines 106 and 108 to the CO. Filter 114 rejects any of the unwanted downstream signal frequencies coupled through mixer 110 to preamplifier 112, and also helps to afford a low system noise floor. In a preferred embodiment, low pass filter 114 may also be an 11-th order elliptical filter that provides 80 dB to 90 dB rejection to downstream frequencies above 164 kHz.

As also illustrated in FIG. 1, line conditioner 100 may further include a downstream signal peak detector 162 coupled to a positive line 164 from the peak equalizer amplifier 126, and may include an upstream peak detector 166 coupled to the positive line 168 from the upstream filter 114 to the upstream driver amplifier 116. The outputs of the peak detectors are applied to the microcontroller 160 which uses the peak detected values during the pre-operating calibration/equalization setup procedure to automatically adjust the gain and attenuation settings of preamplifiers 112 and 122 to equalize for the attenuation to the upstream and downstream signals caused by the actual TP lines in which the line conditioner is used.

Briefly summarized, during the pre-operational equalization setup procedure, the line conditioner automatically calibrates itself to the actual TP line in which it is used. The line conditioner does this by first determining the effective TP line impedance between the CPE and the line conditioner, which is a function mainly of wire length and gauge between the CPE and the line conditioner, during which upstream preamplifier 112 is set to a default setting. Next it sets the gain or attenuation of the upstream preamplifier 112 to a predetermined nominal setting, preferably by selecting a value from an array of stored empirically-determined values of gains and attenuation. Likewise, it determines the downstream line impedance between the line conditioner and the CO, during which downstream preamplifier 122 is set to a default setting, and uses the determined downstream impedance to select a predetermined nominal gain or attenuation setting, also preferably from an array of empirically-determined values of gains and attenuation, that optimize performance.

In more detail, the pre-operational equalization setup procedure of the line conditioner uses the standard DSL synchronization protocol that sets up the DSLAM in the CO and the CPE modem. During a first stage of the setup, the upstream driver amplifier 116 is turned off by the microcontroller 160 while the CPE modem sends out towards the CO standard "handshaking" setup tones at spaced frequencies within the upstream frequency spectrum. The setup tones emitted by the CPE modem are at a predetermined power level and spaced at preset frequencies in accordance with the DSL synchronization protocol. Since the driver amplifier 116 is turned off, the tones do not reach the CO. Thus, the DSLAM at the CO remains in a quiescent state and does not respond to the setup tones. The upstream peak detector 166 detects the peak value of the composite tones on line 168 from filter 114, and supplies the peak-detected value to microcontroller 160, which may include an A/D converter that converts the peak-detected value to a digital value. Thus, the digitalized peak-detected value of the composite tones at the output of the upstream filter is a measure of the effective TP line impedance (accounting for wire length and gauge) between the CPE and the line conditioner. The microcontroller 160 uses the peak-detected digital value to set a nominal gain or attenuation setting into the upstream preamplifier 112. During the upstream signal path setup, the downstream driver 128 is turned on so that the CPE modem sees an active termination and the synchronization tone signals are terminated as required for normal operation.

Following setup of the upstream signal path, the downstream signal path is setup by turning on upstream amplifier 116 and turning off downstream driver 128. This enables the setup tones from the CPE modem to reach the DSLAM at the CO. The CO responds by sending out standard "handshaking" tones that are spaced at preset frequencies within the downstream frequency spectrum in accordance with the DSL synchronization protocol. Because the downstream driver 128 is turned off, the CPE modem does not respond to these downstream tones, and the CO continues to broadcast them. Peak detector 162 detects the peak value of the composite tones on line 164 from the peak equalizer 126, and supplies the detected peak value to microcontroller 160, where the peak-detected value may be converted to a digital value. As with the upstream path setup, the peak-detected value of the composite downstream tones is a measure of the effective TP line impedance (accounting for wire length and gauge) between the line conditioner and the CO DSLAM. The microcontroller 160 uses the peak-detected value to preset another nominal gain or attenuation setting into the downstream broadband preamplifier 122.

Thus, during the equalization setup procedure, microcontroller 160 analyzes the two peak detected voltages from the upstream and the downstream signal paths and may produce a pair of indices X and Y which are used as indexes into a two-dimensional (2-D) array in a memory of the microcontroller that stores predetermined nominal gain or attenuation values. The 2-D array responds to the X and Y indices by producing a corresponding pair of gain (or attenuation) values, and the microcontroller 160 programs the gains (or attenuations) into the two preamplifiers 112 and 122. The gain values stored in the 2-D array may be empirically determined using a reference system comprising telephone wire line simulators that simulate copper 26 AWG telephone TP line of different lengths. The reference system enables empirical determination of preamplifier settings for optimum performance for different combinations of telephone line impedances and data rates. Finally, when amplifier drivers 116 and 128 are turned on, with the selected nominal gain or attenuation settings from the 2-D array having been previously loaded into preamplifiers 112 and 122, the CPE modem and the CO DSLAM are allowed to negotiate and synchronize with one another. Because of the enhanced signal quality afforded by the line conditioner, the CO DSLAM and CPE modem appear to one another to be closer than they actually are, and are able to synchronize with a higher data rate and higher performance than otherwise conventionally available for the actual distance.

Figure 3:
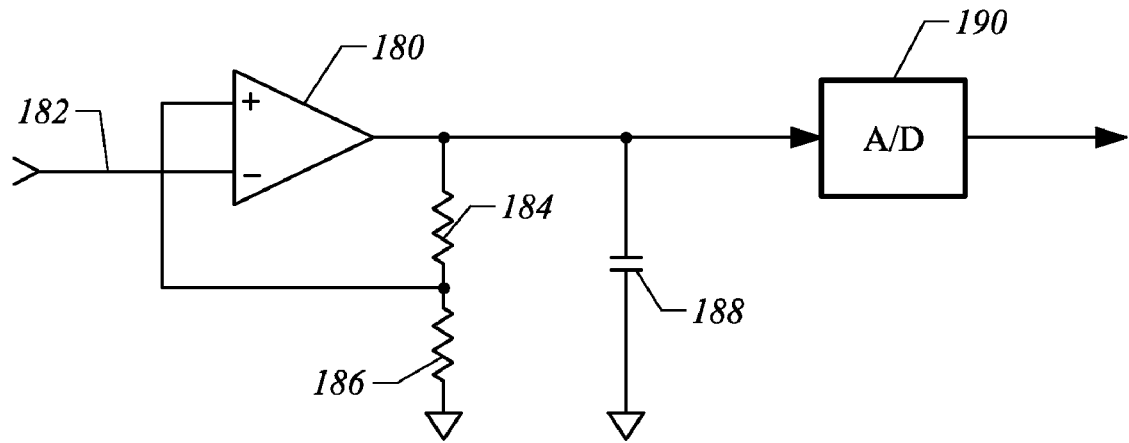
FIG. 3 is a schematic diagram of an embodiment of a peak detector which may be employed in the line conditioner of FIG. 1.

A preferred embodiment of a peak detector that may be employed in the invention is illustrated in FIG. 3. The downstream peak detector 162 and the upstream peak detector 166 may be substantially the same and be as illustrated in the figure. As shown, the peak detector may comprise a low noise, low power comparator 180 that compares a voltage input 182 to a reference voltage set by a voltage divider network comprising resistors 184, 185 connected to the comparator output, and charges a capacitor 188 to a voltage determined by the level of the input. The voltage on the capacitor represents the composite level of the tones that comprise the input voltage 182, whose amplitude in this preferred embodiment is proportional to the TP line impedance, which is a function mainly of wire length and gauge. An analog-to-digital (A/D) converter 190 (which may be either separate or contained within microcontroller 160, as described above) converts the voltage to a digital value. The default values of gain or attenuation that are set into preamplifiers 112 and 122 may be convenient values selected so that the peak detectors 162 and 166 operate in a compliant range of the A/D converter.

FIGS. 4-9 illustrate in more detail preferred embodiments of various ones of the components of line conditioner 100 shown in FIG. 1. In the figures, values are shown for many of the circuit components such as resistors, capacitors, and inductors. These are merely representative values of circuit elements that may be used for the particular embodiments illustrated in the figures in order to achieve the objectives of the invention in an ADSL2+ environment. Neither the particular embodiments illustrated in the figures for the various components of the line conditioner, nor the value of the circuit elements selected for these embodiments, are necessary to the invention. Rather, as will be appreciated by those skilled in the art, different embodiments as well as circuits having other values may be employed in practicing the invention.

Figure 4:
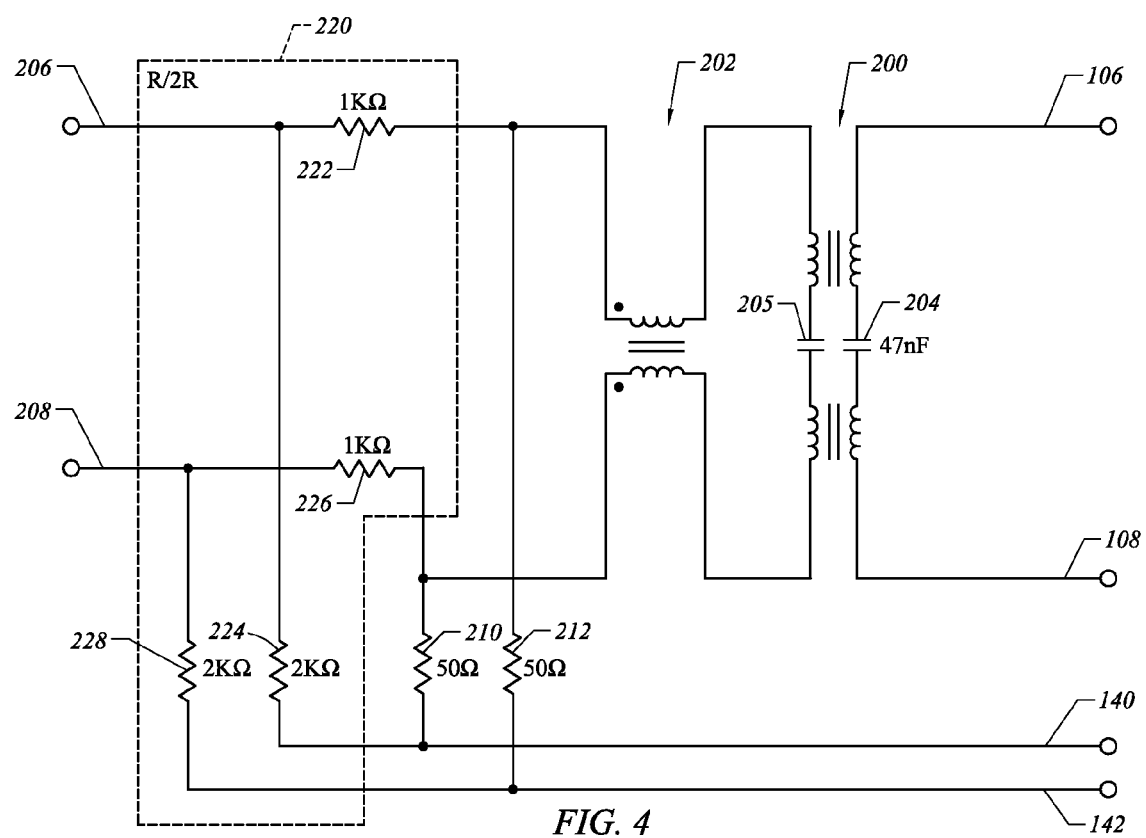
FIG. 4 is a schematic diagram of a mixer which may be employed in the line conditioner of FIG. 1.

FIG. 4 illustrates a preferred embodiment of downstream mixer 120. As previously mentioned, upstream mixer 110 may be substantially identical to downstream mixer 120. As shown in the figure, the positive and negative signals on the Tip and Ring lines 106 and 108, respectively, enter the mixer from the CO. The signals on these lines comprise the entire ADSL2+ frequency spectrum from DC to 2.2 MHz. The differential signal entering the mixer on these lines is applied to a DSL transformer 200 which isolates the CO from the line conditioner and blocks the dc to 30 kHz telephone signals. The secondary of the DSL transformer 200 is coupled to a toroid 202 which provides common mode noise rejection for signals entering the mixer and provides differential downstream signals on positive and negative lines 206 and 208 to the broadband preamplifier 122.

Positive and negative upstream signals from the upstream driver amplifier 116 on lines 140 and 142, respectively, enter the mixer on the secondary side of the DSL transformer at the output of the toroid 202. The uplink signals from amplifier 116 enter the mixer through a pair of 50 ohm resistors 210, 212 which match the impedance of DSL transformer 200 to the standard 100 ohm impedance of the CO. The uplink signals entering the mixer are coupled through the common mode rejection toroid 202 and DSL transformer 200 to the lines 106 and 108 to the CO. Capacitor 204 on the primary of the DSL transformer and capacitor 205 on the secondary side block DC current. Downstream signals from the secondary of the DSL transformer on lines 206 and 208 are coupled through an R/2R network 220 comprising two pairs of resistors 222, 224, 226 and 228. The values of the two resistors in each pair have a ratio of 2:1, and nominal values are indicated in the figure. The R/2R network 220 provides approximately a 4 dB reduction in signal strength of the unwanted upstream signal entering on lines 140, 142 that are coupled to the broadband preamplifier on lines 206 and 208.

Figure 5:
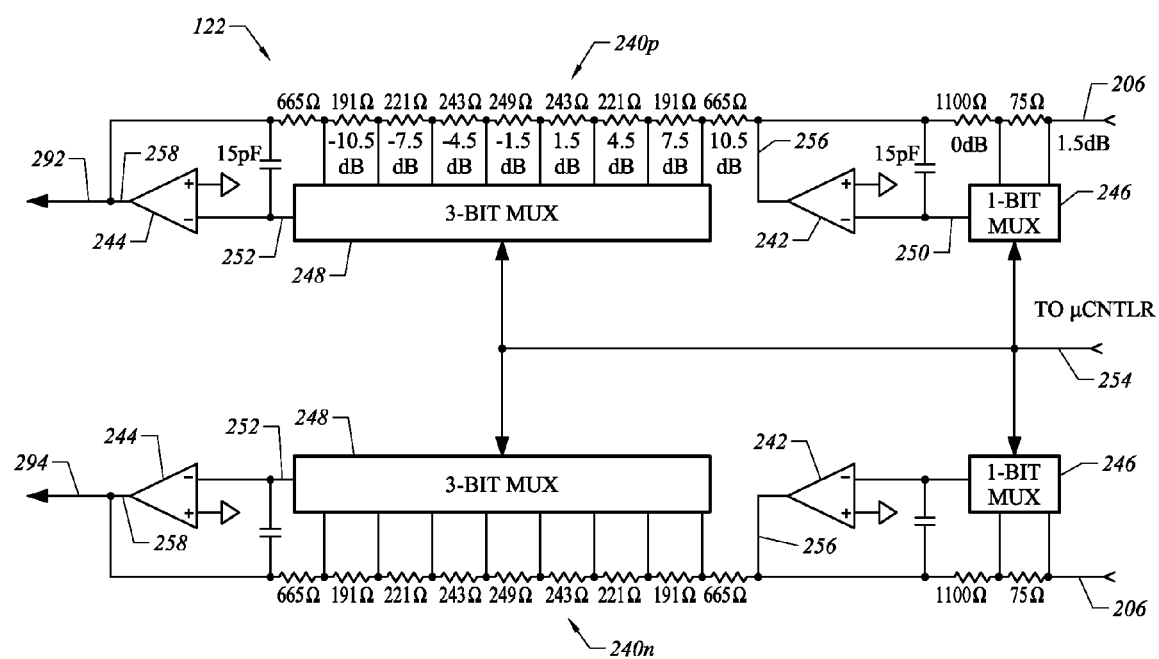
FIG. 5 is a schematic diagram of a downstream adjustable gain preamplifier which may be employed in the line conditioner of FIG. 1.

FIG. 5 illustrates a preferred embodiment of a programmable gain broadband downstream preamplifier 122. As shown in the figure, preamplifier 122 may comprise two identical single-ended programmable amplifiers 240p and 240n, respectively receiving the differential signal from the mixer on positive and negative lines 206 and 208. Each programmable amplifier may comprise a pair of low noise, low power, high bandwidth operational amplifiers 242, 244 having their inverting inputs 250, 252, respectively, connected to the outputs of a one-bit multiplexer 246 and a three-bit multiplexer 248. The multiplexers may be low power CMOS devices. Each multiplexer has a plurality of inputs which are connected to the junctions between a corresponding chain of a plurality of resistors in series. The multiplexers respectively receive one-bit or three-bit digital control signals from the microcontroller via a bussed line 254, and serve as switches which connect their outputs to the inverting inputs 250, 252 of the operational amplifiers 242, 244 to one of the inputs to the multiplexers from the junctions between resistors of the corresponding chain of series resistors. As shown, the outputs 256, 258 of the operational amplifiers are also connected to the respective chains of series resistors. Accordingly, each multiplexer, by switching the multiplexer output to a particular input from the resistor chain, varies the ratio of the feedback resistor value of the opamp to the input resistor value of the opamp, and, accordingly, varies the opamp gain (or attenuation). Accordingly, by appropriately selecting the values of the resistors in the resistor chains, a desired range of gains or attenuations may be provided. For the values of the resistors illustrated in FIG. 5, the gain of opamp 242 may be controlled by the 1-bit multiplexer 246 to be either 0 dB or 1.5 dB. Similarly, the gain of opamp 244 may be controlled by the 3-bit multiplexer 248 to range from −10.5 dB (attenuation) to +10.5 dB (gain) in 3 dB steps. Since opamps 242 and 244 are in series, the gain of preamplifier 240 can be controlled and programmed by the microcontroller to range from −10.5 dB to +12.0 dB.

Figure 6:
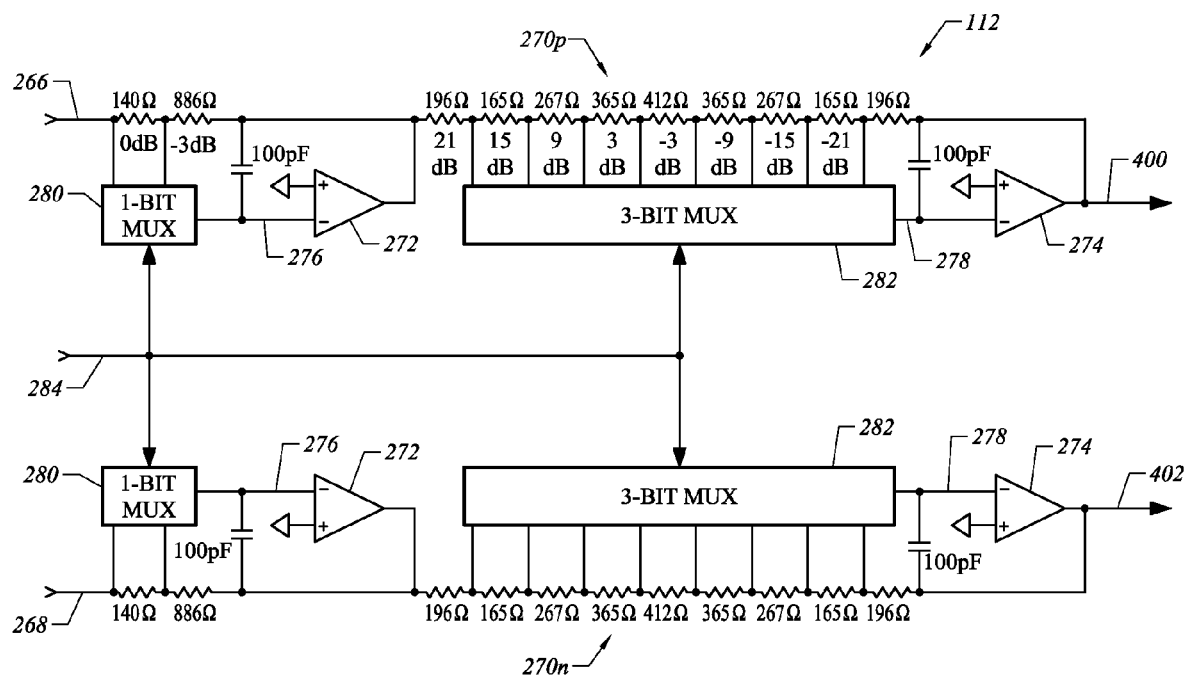
FIG. 6 is a schematic diagram of an embodiment of an upstream adjustable gain preamplifier which may be employed in the line conditioner of FIG. 1.

FIG. 6 illustrates an embodiment of the programmable gain upstream preamplifier 112. The upstream preamplifier 112 may have substantially the same structure as the downstream preamplifier 122, except that it may employ different values of resistors to afford a different range of gains and attenuations. As shown in FIG. 6, the upstream preamplifier may comprise a pair of identical single-ended preamplifiers 270p and 270n for amplifying or attenuating the differential upstream signal on the positive and negative lines 266 and 268, respectively, from upstream mixer 110. As with the downstream preamplifier 122, each upstream preamplifier 270 may comprise a pair of low noise, low power, high bandwidth opamps 272, 274 having their inverting inputs 276, 278 connected to the outputs of a one-bit multiplexer 280 and to a three-bit multiplexer 282, respectively. Each multiplexer may have a plurality of inputs connected to junctions of resistors in corresponding chains of a plurality of series resistors, and each multiplexer allows the ratio of the feedback resistance to the input resistance of its corresponding opamp to be varied by connecting the inputs of the opamps to different resistor junctions in the resistor chains. FIG. 6 illustrates representative values of resistors which may be employed in the resistor chains that permit the gain of opamp 272 to be controlled to be either 0 dB or −3 dB (attenuation); and allows the gain of opamp 274 to be varied from −21 dB to +21 dB in 6 dB increments. This permits the overall gain of the upstream preamplifier 112 to be varied between −24 dB to +21 dB under control of the microcontroller 160. As with the downstream preamplifier, the upstream preamplifier segments 270p and 270n may be controlled and programmed by the microcontroller via control line 284 to have the same gain setting so that the input signals from mixer 110 on lines 266 and 268 are amplified or attenuated by the same amount. The greater range of control in the upstream preamplifier 112 from that provided in the downstream preamplifier 122 is because the CPE modem may be close (e.g., substantially next) to the line conditioner.

As will be appreciated by those skilled in the art, since the gains (or attenuations) of the downstream opamps 242, 244, and the upstream opamps 272 and 274 are controlled by the ratios of the feedback to input resistance values, different values of resistors may be employed to achieve the same ratio, and accordingly, the same gain or attenuation. However, since it is desirable to achieve as low a system noise floor as possible to maximize SNR, it is desirable to minimize the ohmic (thermal) noise. Accordingly, it is desirable to use low values for the resistors to minimize the ohmic noise contribution caused by current flowing through the resistors. However, using low resistances increases the amount of current flowing through the resistors, which increases the operating power, and can affect the slew rates of the opamps. Since the line conditioner is preferably powered from the TP line on which it is used, it is necessary to have a low power budget in order to avoid disrupting normal telephone service. Accordingly, the values of the resistors in the series resistor chains of the preamplifiers can be selected to achieve a desired balance between low noise, low power and high speed. The resistor values shown in FIGS. 5 and 6 were selected based upon these considerations, and represent values that may be employed to achieve the objectives of the invention. Similar considerations to the foregoing were also applied in selecting the representative resistor values of the other circuits of the line conditioner.

Figure 7:
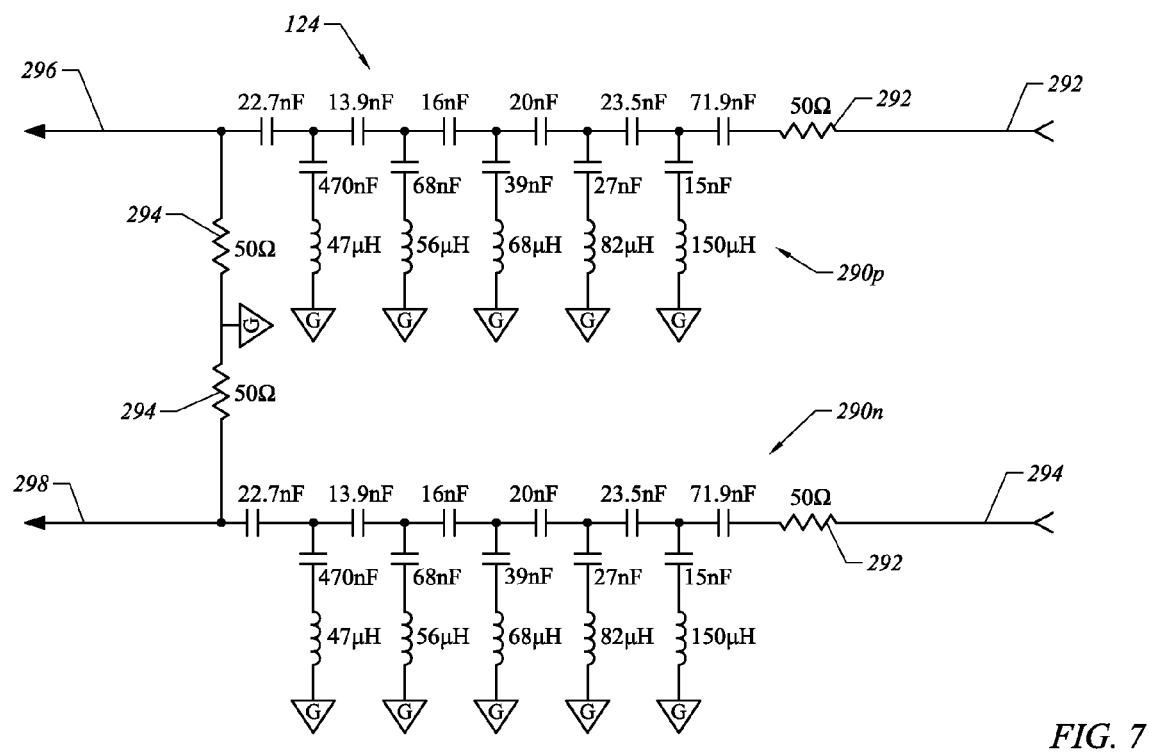
FIG. 7 is a schematic diagram of an embodiment of a downstream filter which may be employed in the line conditioner of FIG. 1.

FIG. 7 illustrates a preferred embodiment of the downstream filter 124. For ADSL, the downstream filter is a high pass filter, as previously indicated. As shown in the figure, the downstream filter 124 preferably comprises two identical single-ended high pass filters 290p and 290n which respectively receive the differential signal on the positive and negative lines 292 and 294 from the preamplifier 122. Two single-ended filters are preferable to one differential filter for low noise performance. It is important that the high pass filters provide high rejection to unwanted out-of-band upstream frequencies that are coupled from mixer 120 through preamplifier 122. This minimizes the noise contribution of such extraneous signals and contributes to affording a low system noise floor. The high pass filters 290p and 290n, in a preferred embodiment, comprise 11-th order elliptical filters having a low frequency cut-off at approximately 164 kHz, the lower end of the downstream frequency spectrum. The capacitive and inductive component values illustrated in FIG. 7 are appropriate to an 11-th order high pass filter with a sharp cut-off at the desired frequency and approximately 80 dB to 90 dB rejection of the unwanted upstream frequencies coupled to the filter through preamplifier 122. This enables the system noise floor of the line conditioner to be maintained at or below 70 dB, which affords low out-of-band noise and high SNR. The 50 ohm resistors 292 and 294 of each filter are for impedance matching. The two single-ended filter outputs on positive and negative lines 296 and 298, respectively, are provided as a differential input to peak equalizer amplifier 126, as indicated in FIG. 8.

Figure 8:
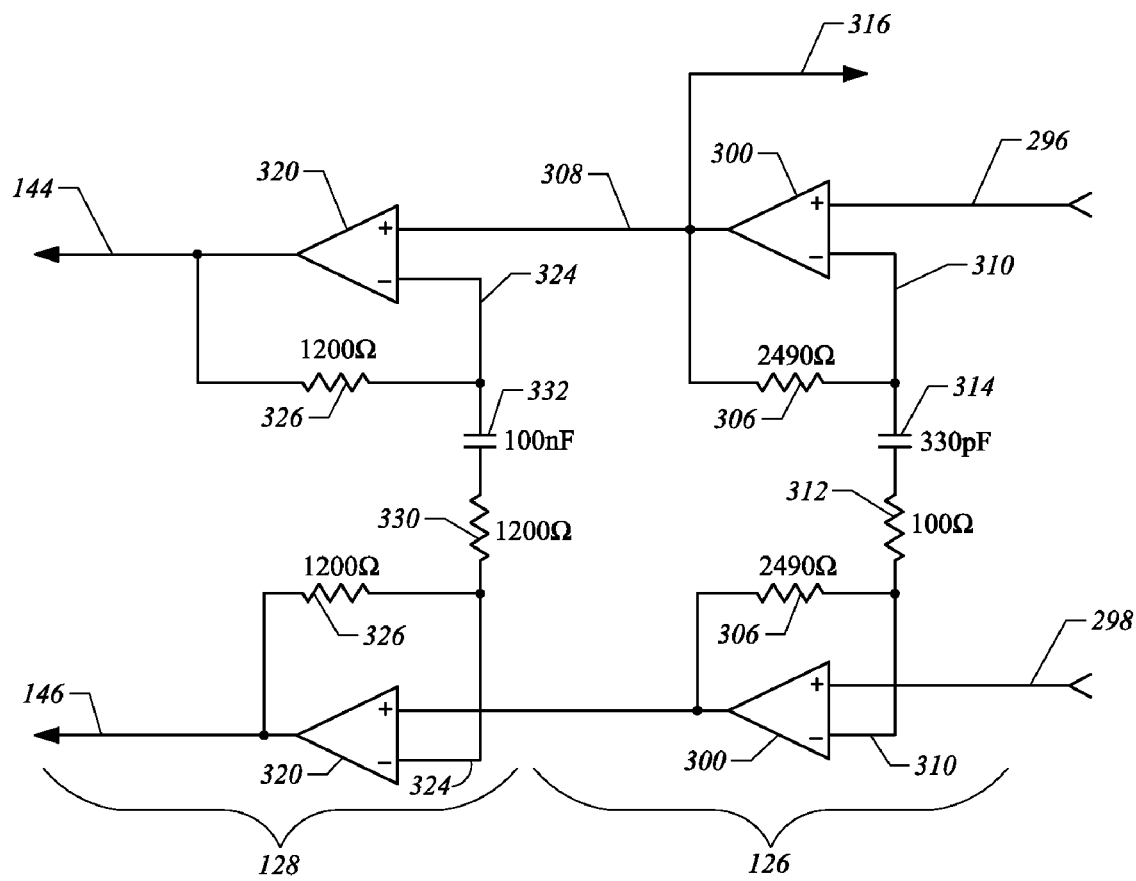
FIG. 8 is a schematic diagram of embodiments of a peak equalizing amplifier and a driver amplifier which may be employed in the line conditioner of FIG. 1.

Referring to FIG. 8, preferred embodiments of peak equalizer amplifier 126 and driver amplifier 128 are shown. As illustrated in the figure, the peak equalizer amplifier and driver amplifier preferably comprise differential amplifier circuits that may have substantially the same structure. The primary function of the peak equalizer amplifier is to provide post-equalization of the downstream signal to overcome the frequency-dependent signal attenuation degradation imposed by the TP line between the CO and the line conditioner, and to provide pre-equalization to correct in advance for the anticipated attenuation degradation that the downstream signal will experience between the line conditioner and the CPE.

The peak equalizer amplifier 126 may comprise a pair of identical low noise, low power, high bandwidth opamps 300, connected together as shown in FIG. 8, to form a differential amplifier. The opamps receive the downstream single-ended signals on lines 296 and 298 on their non-inverting inputs, and have feedback resistors 306 connected between their outputs 308 and their inverting inputs 310. The inverting inputs of the two opamps may also be connected together through a R-C circuit comprising a resistor 312 and a capacitor 314, as shown. The output 308 of the peak equalizer amplifier opamp 300 on the positive line 296 may be tapped as shown at 316 and provided as an input to the downstream peak detector 162 (see FIG. 1).

Figure 10:
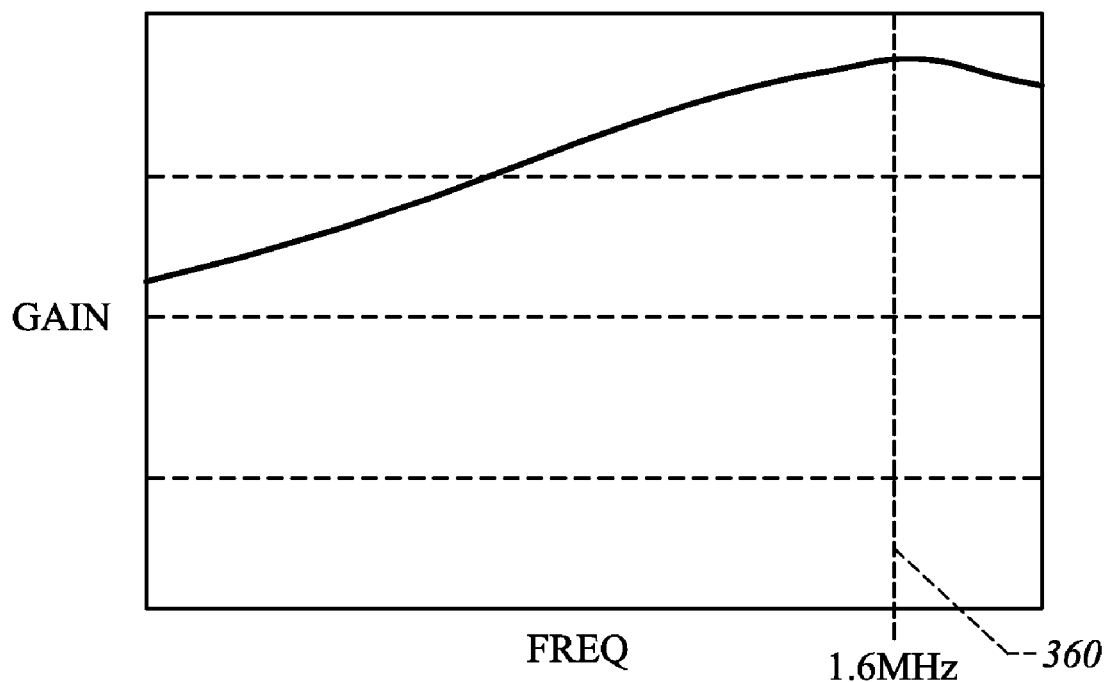
FIG. 10 is a representative gain-frequency response characteristic of the peak equalizer amplifier of FIG. 8.

The gain-frequency characteristic of the peak equalizer amplifier is determined by the values of the resistive and capacitive components 306, 312 and 314. FIG. 10 illustrates a representative gain-frequency response characteristic for peak equalizer 126. The gain of the peak equalizer amplifier is determined by the ratio of the feedback impedance to the input impedance of the opamps. As shown, the gain-frequency characteristic increases to a peak at a particular frequency 360, and then decreases above that frequency. The value of capacitor 314 determines the frequency at which the peak gain occurs, and the value of resistor 312 determines the roll off characteristics of the gain from the peak and the "Q" of the peak equalizer. The actual frequency at which the peak gain occurs is also a function of the inherent characteristics of the opamps 300. Using SPICE models for the opamps and simulations, the actual values of the resistive and capacitive components may be tailored to the particular opamps to provide a desired gain-frequency response characteristic. FIG. 10 illustrates a representative gain-frequency characteristic of the peak equalizer amplifier for the values indicated in FIG. 8. As shown, the peak gain preferably occurs at a frequency of the order of 1.6-1.7 MHz. Increasing the value of capacitor 314 moves the peak gain lower in frequency and, conversely, decreasing the value increases the frequency of the peak gain. Lowering the value of resistor 312 increases the "Q" and provides for a sharper peak and faster roll off of gain, and, correspondingly, increasing the value of the resistor flattens the gain characteristic. Once the peak gain-frequency curve for the peak equalizer amplifier is selected for optimum equalization performance for anticipated combinations of TP lines and distances (TP impedance as a function of wire gauge and wire length), the equalization characteristic of the peak equalizer amplifier may be fixed. Thereafter, further equalization is provided by the line conditioner for the actual line in which it is used is accomplished by setting the gain-attenuation characteristics of the preamplifiers 112 and 122 as previously described.

Driver amplifier 128 may similarly comprise a pair of identical opamps 320 which receive the outputs 308 of opamps 300 on their inverting inputs. Opamps 320 may similarly have feedback resistors 326 connected between their outputs at lines 144 and 146 and their inverting inputs 324, and the inverting inputs also may be connected together through a R-C circuit comprising a resistor 330 and a capacitor 332. Although the driver amplifier 128 has a similar structure to the peak equalizer amplifier, the resistive and capacitive values of the driver amplifier may be selected such that the driver amplifier does not contribute significantly to the over all gain-frequency response to the downstream path. In particular, capacitor 332 in the driver amplifier may be selected to have a value such that the peak gain of the driver occurs in the low audio frequency range of the telephone signals, and to afford a substantially flat gain-frequency characteristic. Rather than serving to set the gain response, capacitor 332 in the driver primarily serves as DC decoupling of the driver opamps.

In order to afford high signal quality, the invention addresses not only for attenuation effects of the TP line on the downstream signal, it also addresses the effects of group delay. Accordingly, line conditioner 100 of the invention is also formed to compensate the upstream and downstream signals to correct for the adverse effects of frequency dependent group delay, and, preferably, to afford a relatively constant group delay. Compensation is primarily applied to the downstream signal where, because of the higher frequency spectrum, the deleterious effects of group delay are most severe. The line conditioner post-compensates the signals entering the line conditioner to correct for group delay imposed by the TP lines over which the entering signals were transmitted, and pre-compensates the signals leaving the line conditioner for the anticipated group delay that will be imposed by the TP lines over which the leaving signals will be transmitted.

The group delay compensation provided by the line conditioner 100 to the downstream signal is determined primarily by the peak equalizer amplifier 126 and by other downstream circuits such as the broadband preamplifier 122 and filter 124. Accordingly, the peak equalizer amplifier characteristics and the characteristics of the preamplifier and filter may be selected so that the line conditioner pre- and post-compensation affords the overall desired optimum group delay response. This may be accomplished using the reference system (described previously) and simulation modeling of the nominal anticipated characteristics of the TP lines in which the line conditioner will be used and the characteristics of the line conditioner circuits in downstream signal chain to select component values that afford the desired response.

Considering now the upstream signal path, as previously described upstream mixer 110 may be substantially the same as downstream mixer 120; and the upstream preamplifier 112 may be substantially the same as the downstream preamplifier 122, except that the upstream preamplifier may be provided with different gain and attenuation settings. Because the upstream signal is in a lower frequency spectrum, it does not experience the same degradation as the downstream signal, and may have a substantially different level.

Figure 9:
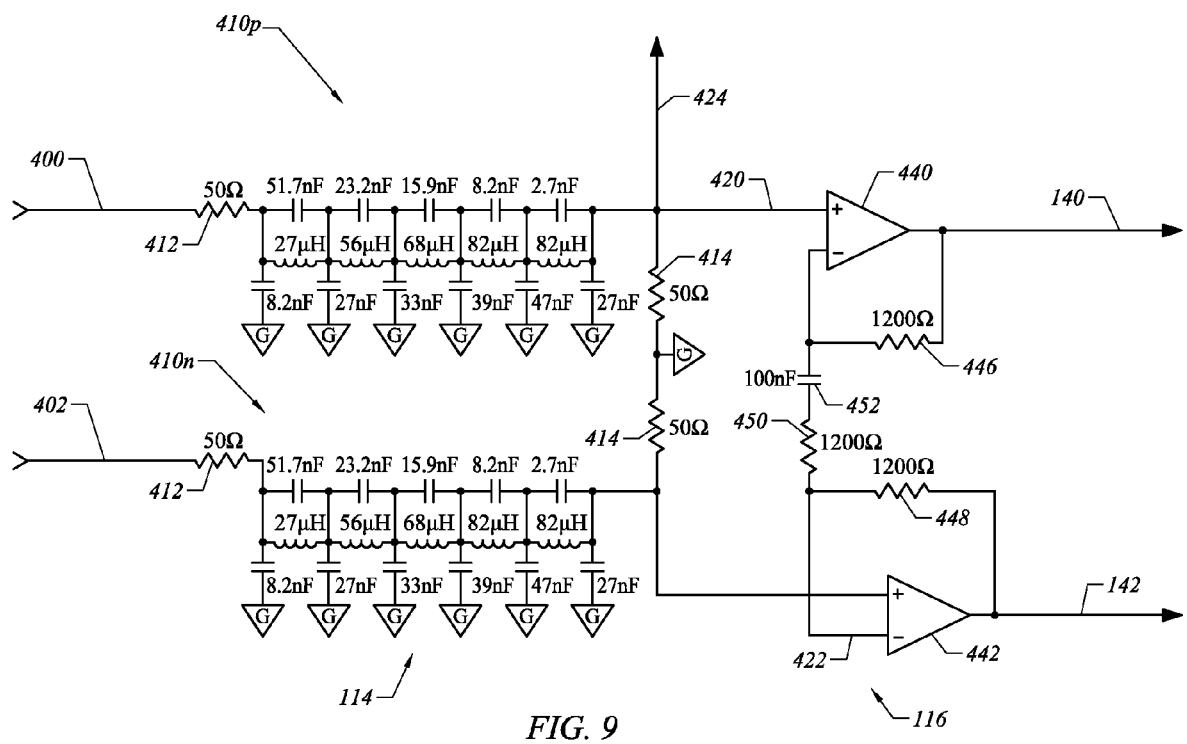
FIG. 9 is a schematic diagram of embodiments of an upstream filter and an upstream driver amplifier which may be employed in the line conditioner of FIG. 1.

From the upstream preamplifier 112, the single-ended upstream signals on the positive and negative output lines 400, 402 of the upstream preamplifier are provided to the upstream filter 114, which, as with the downstream filter, preferably comprises two single-ended filters rather than a differential filter. Preferred embodiments of the upstream filter 114 and the upstream driver amplifier 116 are illustrated in FIG. 9. As shown, the upstream filter preferably comprises two identical 11-th order elliptical low pass filters 410p and 410n. The filters may be designed to have a sharp cut-off frequency slightly above the upper end of the upstream frequency spectrum at 125 kHz, and to provide high rejection of the order of 80 dB to 90 dB to out-of-band downstream frequencies that may be coupled through the mixer 110 and preamplifier 112. The resistive, capacitive and inductive values indicated in FIG. 9 are exemplary values that afford low pass filters having the desired characteristics. The 50 ohm input resistors 412 and the 50 ohm output resistors 414 of the filters are for impedance matching. The single-ended outputs from filters 410p and 410n on lines 420 and 422 are supplied as a differential input signal into the differential upstream preamplifier 116. The positive output signal line 420 from the filter 410p may be tapped as shown at 424 and provided to the upstream peak detector 166 (see FIG. 1).

Upstream driver amplifier 116, in a preferred embodiment, comprises a differential amplifier that may have the same structure as downstream driver amplifier 128. As shown, the upstream amplifier comprises a pair of differentially connected opamps 440 and 442 having their non-inverting inputs connected to the positive and negative outputs 420 and 422, respectively, from the filter. Feedback resistors 446 and 448 may be connected between the outputs 140 and 142, respectively, and the inverting inputs of the opamps as shown. The inverting inputs may further be connected together through an R-C network comprising a resistor 450 and a capacitor 452, as shown. A differential output of the upstream preamplifier on lines 140 and 142 is provided to the downstream mixer 120, as previously described.

As previously described, in order to achieve the desired objective of high performance, it is desirable to keep the added noise due to circuit elements and components as low as possible, and to employ designs, layouts and structures for the various circuits of the line conditioner that afford high common mode rejection and low crosstalk. Moreover, because operating power for the line conditioner is preferably derived from the TP lines on which it is used, it is desirable to keep the operating power low to avoid disruption of the normal telephone service. In order to meet the desired objectives of low noise and low power, careful selection of low noise, high bandwidth and low power opamps is necessary. Additionally, it is desirable to minimize ohmic noise by using low values of resistors in circuits. However, since as the resistance values decrease, the power consumption increases, appropriate trade offs may be made to achieve the desired objectives.

The upstream and downstream filters are also important for achieving high performance. This is particularly true of the downstream filter since the higher frequencies of the downstream signal experience more degradation and loss than do the upstream signals. The type of filter selected and its roll off characteristics influence not only the amount of rejection of unwanted out-of-band frequencies which can contribute to raising the noise floor, the filter also influences the group delay through the signal path. The 11-th order elliptical filters used in the invention have the desired sharp roll-off and high rejection characteristics, and their circuit components may be readily adjusted to provide the desired group delay characteristic. As will be appreciated, however, other filters types and other designs and components may be employed to achieve the objectives of the invention.

The standard ADSL protocol employs Reed Solomon (RS) error correcting codes that have the property of allowing reconstruction of lost data. The amount of lost data that may be reconstructed depends upon the number of RS bits employed for error correction. If the data loss exceeds the predetermined amount of RS correctible data, a code violation occurs and the data remains uncorrectable. An alternate measure of data loss is bit error rate ("BER"). Television video employs a UDP/IP lossy protocol. As the number of R-S code violations increases, pixilation occurs, in which groups of video pixels are lost. This can cause "sparkle" on a video image. Data integrity is a function of both signal quality and SNR. A high data rate that may be achievable with high signal levels does not necessarily provide high data integrity, since signal quality may be degraded sufficiently due to group delay, crosstalk and inter-symbol interference to produce an undesirable level of code violations. The invention uses the number of code violations and/or BER as a measure of high performance, and optimizes performance by reducing the number of code violations or BER to an acceptable level.

The gain-attenuation levels of preamps 112 and 122 that are stored in the 2-D table may be derived empirically to these values to produce optimal performance for a given set of line conditions. Accordingly, the peak detected voltages from peak detectors 162 and 166 for the downstream and upstream signals are an effective measure of the TP line characteristics between the CPE, CO and the line conditioner. Based upon the detected values, which equate to an effective impedance or distance, the empirically derived values in the 2-D table may be selected to set the gains and attenuations to provide the desired optimum level of performance for the particular TP line in which the line conditioner is employed. It has been found that the invention, by focusing on optimum performance, by maximizing SNR and optimizing signal quality, results in the desired level of performance being achievable at much greater distances between the line conditioner and the CO and CPE than is achievable without the line conditioner.

While the foregoing has been with reference to particular embodiments of the invention, it will be appreciated by those skilled in the art that changes in these embodiments may be made without departing from the principals and the spirit of the invention, the scope of which is defined by the appended claims.

The invention claimed is:

1. A method of conditioning a twisted pair telephone line at an intermediate location in the twisted pair line between a central office and a customer premises for high data rate broadband operation, comprising:

measuring at said intermediate location first characteristics of a first portion of the twisted pair line extending between the customer premises and the intermediate location by using standard DSL handshaking tones in an upstream frequency spectrum that are transmitted from the customer premises over said first portion of the line while preventing the tones from reaching the central office;

measuring at said intermediate location second characteristics of a second portion of the twisted pair line extending between the central office and the intermediate location by using standard DSL handshaking tones in a downstream frequency spectrum that are transmitted from the central office over said second portion of the line while preventing the tones from reaching the customer premises;

said upstream and downstream frequency spectrums being different frequency spectrums above voice frequencies and said measuring being performed automatically;

equalizing at said intermediate location the first and second portions of the twisted pair line by providing first and second gains to upstream and downstream signals to overcome line attenuation in said upstream and said downstream frequency spectrums, respectively; and compensating the twisted pair line at said intermediate location for the effects of group delay.

2. A method of conditioning a twisted pair telephone line at an intermediate location of the line between a central office and a customer premises for high data rate broadband operation comprising:

automatically measuring at said intermediate location levels of standard DSL handshaking tones in an upstream frequency spectrum that are transmitted from the customer premises while preventing the tones from reaching the central office;

automatically measuring at said intermediate location levels of standard DSL handshaking tones in a downstream frequency spectrum that are transmitted from the central office while preventing the tones from reaching said customer premises;

said upstream and said downstream frequency spectrums being different frequency spectrums above voice frequencies; and equalizing the twisted pair line at said intermediate location in response to said measuring by providing a first gain to upstream signals over said upstream frequency spectrum to overcome line attenuation of the upstream signals from the customer premises to the central office, and by providing a second gain to downstream signals over said downstream frequency spectrum to overcome line attenuation of the downstream signals from the central office to the customer premises.

3. The method of claim 2, wherein providing said second gain comprises low noise pre-amplifying the downstream signals over said downstream frequency spectrum to provide high signal-to-noise.

4. A line conditioner for use on a twisted pair telephone line at an intermediate location of the twisted pair line between a central office and a customer premises for conditioning the twisted pair line for high data rate broadband operation, comprising;

first and second programmable gain amplifiers for respectively equalizing the twisted pair line at said intermediate location for upstream signals from the customer premises to the central office over an upstream frequency spectrum and for downstream signals from the central office to the customer premises over a downstream frequency spectrum, the upstream and downstream frequency spectrums being different frequency spectrums above voice frequencies;

first and second detectors for respectively detecting the levels of upstream and downstream standard DSL handshaking tones in the upstream frequency spectrum and in the downstream frequency spectrum, said levels being related to line attenuation of the upstream signals and the downstream signals in said upstream and downstream frequency spectrums, respectively; and a microprocessor responsive to the detection of said upstream tones for controlling the line conditioner to prevent the upstream tones from reaching the central office while measuring the levels of the upstream tones, and for preventing the downstream tones from reaching the customer premises while measuring the levels of the downstream tones, the microprocessor determining said line attenuation from said levels and programming a first gain into said first amplifier and a second gain into said second amplifier for said equalizing said twisted pair line for said line attenuation.

5. The method of claim 1, wherein said equalizing and said compensating correct for signal degradation imposed by both the first and second portions of the line and are performed prior to said high data rate broadband operation.

6. The method of claim 1, wherein providing said first and said second gains comprises low noise amplifying said upstream signals and said downstream signals to provide high signal-to-noise.

7. The method of claim 6, wherein the first and second gains are different gains to equalize for different attenuations of the upstream and downstream signals.

8. The method of claim 1 further comprising filtering at said intermediate location the downstream signals to reject upstream signals and filtering the upstream signals to reject downstream signals prior to said equalizing.

9. The method of claim 1, wherein said measuring comprises measuring levels of said standard DSL handshaking setup tones, and said equalizing comprises providing said first and second gains based upon said measured levels.

10. The method of claim 1, wherein said equalizing further comprises providing a predetermined gain-frequency characteristic to downstream signals over said downstream frequency spectrum that equalizes the line for an attenuation-frequency characteristic of the line over the downstream frequency spectrum.

11. The method of claim 1, wherein said compensating comprises post-compensating for group delay of the second portion of the twisted pair line between the central office and the intermediate location, and pre-compensating for group delay of the first portion of the twisted pair line between the intermediate location and the customer premises.

12. The method of claim 10, wherein said equalizing comprises providing said gain-frequency characteristic to have a varying gain-frequency characteristic and a peak response at a predetermined frequency in the downstream frequency spectrum.

13. The method of claim 2 further comprising compensating said downstream signals at said intermediate location for group delay of the twisted pair line over said downstream frequency spectrum.

14. The method of claim 2, wherein said equalizing comprises providing said first and second gains for said upstream and said downstream signals, respectively, based upon measured levels of said tones.

15. The method of claim 2, wherein said equalizing said twisted pair line comprises providing a predetermined gain-frequency characteristic that equalizes the line for an attenuation-frequency characteristic of the line over said downstream frequency spectrum.

16. The method of claim 3, further comprising filtering said downstream signals in said downstream frequency spectrum following said low noise pre-amplifying to reject upstream signals, and filtering the upstream signals in said upstream frequency spectrum to reject downstream signals.

17. The line conditioner of claim 4, wherein said first and second detectors comprise peak detectors that measure first peak values of said upstream tones and second peak values of said downstream tones, respectively, and wherein said microprocessor in response to said first and said second peak values selects the first and second preamplifier gains from a table of stored predetermined gains to equalize the twisted pair line for said line attenuation in said upstream and downstream frequency spectrums, respectively.

18. The line conditioner of claim 17, wherein said stored gains comprise predetermined gain values for equalizing twisted pair lines of different impedances.

19. The line conditioner of claim 4 further comprising an equalizer for applying a pre-selected gain-frequency characteristic to downstream signals over said downstream frequency spectrum to equalize for frequency dependent attenuation of the twisted pair line.

20. The line conditioner of claim 19 wherein the equalizer provides a peak response at a predetermined frequency in an upper portion of the frequency spectrum of the downstream signal.

21. The line conditioner of claim 20, wherein the equalizer comprises low noise, low power operational amplifiers connected together by a resistor-capacitor network to form a differential amplifier, the value of the capacitor being selected to provide said predetermined frequency of peak response and the value of said resistor being selected to provide a predetermined shape to said gain-frequency characteristic.

22. The line conditioner of claim 4, wherein said downstream signals and said upstream signals comprise differential signals, and wherein the first and second amplifiers each comprise a pair of single-ended programmable gain preamplifiers for separately amplifying the differential signals on the twisted pair line.

23. The line conditioner of claim 22 further comprising a first filter connected to the first preamplifier for passing the upstream signals and for providing high rejection to the downstream signals, and a second filter connected to the second preamplifier for passing the downstream signals and providing high rejection to the upstream signals.

24. The line conditioner of claim 23, wherein the first filter comprises an 11-th order elliptical low-pass filter, and said second filter comprises an 11-th order elliptical high-pass filter.

25. The line conditioner of claim 23, wherein the first and second filters each comprise a pair of single-ended filters, one single-ended filter of the pair receiving an output from a corresponding one of said single-ended programmable gain preamplifiers.

26. The line conditioner of claim 22, wherein each signal-ended programmable gain preamplifier comprises cascaded operational amplifiers, each operational amplifier being connected to an associated plurality of resistors and to a multiplexer, the multiplexer being connected to the plurality of resistors and being controlled by the microprocessor to connect different ones of said resistors to the operational amplifiers to vary the gain of the operational amplifiers.

27. The line conditioner of claim 26, wherein the values of the resistors in said plurality of resistors are selected to vary the gain of a programmable gain preamplifier between a first predetermined negative gain value and a second predetermined positive gain value in pre-selected increments of gain.

28. The line conditioner of claim 27, wherein said operational amplifiers are low noise devices, and wherein the resistors are selected to have low resistance values to reduce their ohmic noise contribution.

29. The line conditioner of claim 4, wherein said high data rate broadband operation comprises DSL operation, and wherein said downstream frequency spectrum extends to a frequency of the order of 12 MHz.

30. The line conditioner of claim 4, wherein the line conditioner is formed to compensate for group delay of the twisted pair line between the central office and the customer premises.

31. The line conditioner of claim 4, wherein the line conditioner derives operating power from the twisted pair line, and wherein the line conditioner comprises circuit elements selected for low power operation such that the power derived from the twisted pair line does not disrupt normal telephone operations.

32. The line conditioner of claim 4, wherein said downstream standard DSL handshaking tones are produced by a DSLAM at the central office, and said upstream standard DSL handshaking tones are produced by a DSL modem at the customer premises.

33. The method of claim 4 further comprising actively terminating the twisted pair line at said intermediate location for upstream signals to the central office while measuring said downstream tones from the central office, and actively terminating the twisted pair line at said intermediate location for downstream signals to the customer premises while measuring said upstream tones from the customer premises.

34. The method of claim 1 further comprising actively terminating the twisted pair line at said intermediate location for upstream signals to the central office while measuring said downstream tones from the central office, and actively terminating the twisted pair line at said intermediate location for downstream signals to the customer premises while measuring said upstream tones from the customer premises.

* * * * *